(12) United States Patent
Barnett

(10) Patent No.: US 10,913,320 B2
(45) Date of Patent: Feb. 9, 2021

(54) SUSPENSION BEARING LUBRICATING SYSTEM

(71) Applicant: Wyatt Barnett, Aledo, IL (US)

(72) Inventor: Wyatt Barnett, Aledo, IL (US)

(*) Notice: Subject to any disclaimer, the term of this patent is extended or adjusted under 35 U.S.C. 154(b) by 0 days.

(21) Appl. No.: 16/445,169

(22) Filed: Jun. 18, 2019

(65) Prior Publication Data
US 2019/0299733 A1 Oct. 3, 2019

Related U.S. Application Data

(63) Continuation of application No. 15/857,353, filed on Dec. 28, 2017, now Pat. No. 10,343,474, which is a continuation of application No. 14/971,973, filed on Dec. 16, 2015, now abandoned.

(51) Int. Cl.
F16C 33/10 (2006.01)
B60G 7/00 (2006.01)
B60G 11/12 (2006.01)
F16C 33/66 (2006.01)
F16C 11/04 (2006.01)

(52) U.S. Cl.
CPC .............. B60G 7/001 (2013.01); B60G 11/12 (2013.01); F16C 33/102 (2013.01); F16C 33/6677 (2013.01); B60G 2204/418 (2013.01); F16C 11/045 (2013.01); F16C 2326/05 (2013.01)

(58) Field of Classification Search
CPC ................... F16C 33/102; B60G 7/001; Y10T 403/32861; Y10T 403/32868; Y10T 403/32877; Y10T 403/32885; Y10T 403/32893; Y10T 403/32918; Y10T 403/32926; Y10T 403/32934; Y10T 403/32951; Y10T 403/257; Y10T 403/259; Y10T 403/255
See application file for complete search history.

(56) References Cited

U.S. PATENT DOCUMENTS

| 2,333,183 | A | | 11/1943 | Jones |
| 2,847,238 | A | | 8/1958 | Bolling |
| 3,129,966 | A | * | 4/1964 | Blank ........................ F16C 5/00 403/150 |
| 3,179,451 | A | * | 4/1965 | Blank, Sr. ................. F16C 5/00 403/152 |
| 4,576,488 | A | | 3/1986 | Steiner et al. |

(Continued)

Primary Examiner — Joshua T Kennedy
(74) Attorney, Agent, or Firm — Hamilton IP Law, PC; Jay R. Hamilton; Charles A Damschen

(57) ABSTRACT

A Suspension Bearing Lubricating System, lubricating moving parts engaging with pivoting suspension component bearings used in street motorcycles, dirt bikes, all-terrain vehicles and various other machines. The Suspension Bearing Lubricating System comprises of a bolt hollowed internally and capped with a grease fitting (or form of lubrication receptacle) or a bolt which is hollow at both ends but solid in the center and a specialized bushing allowing for the flow of grease. Lubricant will be inserted via a lubricant receptacle; lubricant will travel into the bolt then out of holes in the shaft of the bolt which will allow passage of lubricant into bushing if applicable. Once lubricant reaches specialized bushing it will travel into integrated grooves to holes in the bushing then out, directly in contact with the suspension component bearings.

20 Claims, 6 Drawing Sheets

(56) References Cited

U.S. PATENT DOCUMENTS

| | | | | |
|---|---|---|---|---|
| 4,607,977 | A * | 8/1986 | Varnelis | F16C 11/045 |
| | | | | 29/525.03 |
| 4,988,218 | A * | 1/1991 | Quaglia | F16C 9/04 |
| | | | | 184/6.5 |
| 5,211,484 | A * | 5/1993 | Quaglia | F16C 9/04 |
| | | | | 384/322 |
| 6,450,073 | B1 * | 9/2002 | Boyer | B23Q 1/40 |
| | | | | 82/129 |
| 6,698,932 | B2 * | 3/2004 | Hamaguchi | E02F 9/006 |
| | | | | 384/275 |
| 7,651,274 | B2 * | 1/2010 | Yamamoto | E02F 9/006 |
| | | | | 384/203 |
| 8,459,894 | B2 * | 6/2013 | Svensson | F16C 11/045 |
| | | | | 37/466 |
| 9,441,669 | B2 * | 9/2016 | Villemagne | F16C 3/02 |
| 2010/0158601 | A1 | 6/2010 | Madrid et al. | |
| 2013/0206513 | A1 | 8/2013 | Webb et al. | |

* cited by examiner

SUSPENSION BEARING LUBRICATING SYSTEM

CROSS REFERENCE TO RELATED APPLICATIONS

The present application is a continuation-in-part application of and claims priority from U.S. patent application Ser. No. 15/857,353 filed on Dec. 28, 2017, which application was a continuation of and claimed priority from U.S. patent application Ser. No. 14/971,973 filed Dec. 16, 2015, all of which are incorporated by reference herein in their entireties.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. § 1.71 (d)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

Field of the Invention

A suspension assembly composed of a (but not limited to) swing arm, shock and linkage assembly is commonly utilized in street motorcycles, dirt bikes, all-terrain vehicles and various other machines. The movement and proper function of the suspension assembly is crucial to the overall performance of said machine. These parts experience a lot of wear due to friction, water, dirt, sand and other contaminates getting inside the suspension component's bearings and/or bushings and shortening the life of the bearings. Proper and thorough lubrication of the swing arm and suspension linkage bearings can help slow and reduce such wear. Over a period of time without lubrication the suspension bearings will become filled with contaminants, oxidize, and seize causing the machine's handling capabilities and performance to decrease. The decrease in suspension handling capabilities and performance can lead to (but is not limited to) malfunction, crashes, property damage, injury and death.

However, the assemblies must be easily accessible for lubrication and the lubrication must cover a substantial portion of the surface area of the swing arm and linkage bearings to properly lubricate them. Regular suspension bolts are not able to provide grease to the bushings to lubricate the suspension component bearings. The said bearings are difficult to lubricate, due to the fact the user must partially disassemble the machine. The process of removing suspension components to properly and periodically grease the suspension bearings is a time consuming and vigorous process, generally causing the user to neglect the bearings of proper maintenance and lubrication.

Presently, there is no publicly available form of a Suspension Bearing Lubricating System intended for street motorcycles, dirt bikes, all-terrain vehicles and various other machines capable of lubricating a machine's suspension bearings without some disassembly of the machine's suspension components.

SUMMARY OF DISCLOSURE

The Suspension Bearing Lubricating System has many aspects to make it work properly for the application it is intended. Previously, to lubricate the suspension bearings of street motorcycles, dirt bikes, all-terrain vehicles and various other machines one had to partially disassemble the machine. Lubricant applied via a grease gun or some form of lubricating tool, will be able to travel from grease zerks or lubricant receptacle fitted at one or both ends of the bolt (depending on the machine's specific application requirements) into the bolt's hollowed, internal passageway. Once the lubricant fills the passageway, the excess lubricant will flow into a specialized bushing surrounding the bolt shaft (when applicable). The bushing will be suited with a groove inside the bushing which will allow lubricant to travel throughout the entire bushing and eventually reaching the passage holes in the bushing. The lubricant will then travel from the through holes directly into the suspension bearings, internally lubricating them and pushing water, dirt, sand and other contaminates out of the bearing essentially preventing the contaminates from wearing the bearings and or causing them to rust.

When the user uses the Suspension Bearing Lubricating System he/she will only be required to connect a grease gun or lubricant provider to the grease zerk or lubricant receptacle and insert grease or lubricant. Once the lubricant enters via the grease zerk or lubricant receptacle and travels to the bearings, there is no more work needed to be completed by the user. This simplistic maintenance allows the user to quickly and efficiently lubricant the suspension bearings preventing premature wear.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF THE INVENTION

Figure 1:
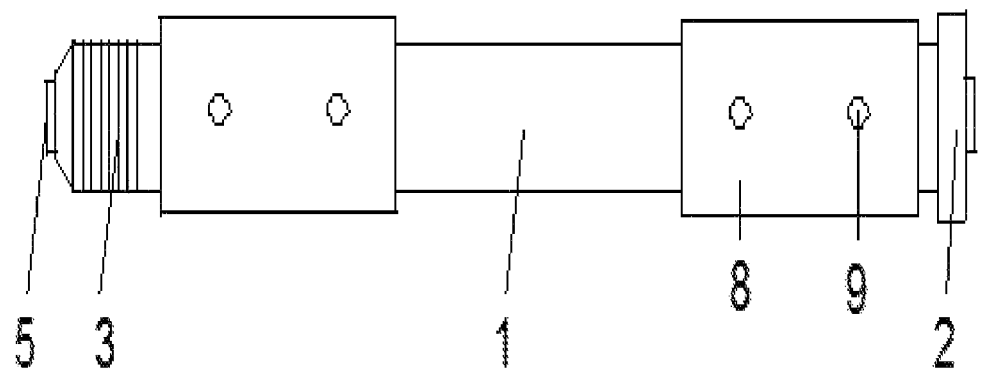
FIG. 1 is a side view of the complete Suspension Bearing Lubricating System with specialized, functional bushings.

Before the present methods and apparatuses are disclosed and described, it is to be understood that the methods and apparatuses are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and apparatuses. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and apparatuses. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and apparatuses may be understood more readily by reference to the following detailed description of preferred aspects and the examples included therein and to the Figures and their previous and following description. Corresponding terms may be used interchangeably when referring to generalities of configuration and/or corresponding components, aspects, features, functionality, methods and/or materials of construction, etc. those terms.

Before the various aspects of the present disclosure are explained in detail, it is to be understood that the disclosure is not limited in its application to the details of construction and the arrangements of components set forth in the following description or illustrated in the drawings. The present disclosure is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description, and do not alone indicate or imply that the device or element referred to must have a particular orientation. In addition, terms such as "first", "second", and "third" are used herein and in the appended claims for purposes of description and are not intended to indicate or imply relative importance or significance.

Figure 2:
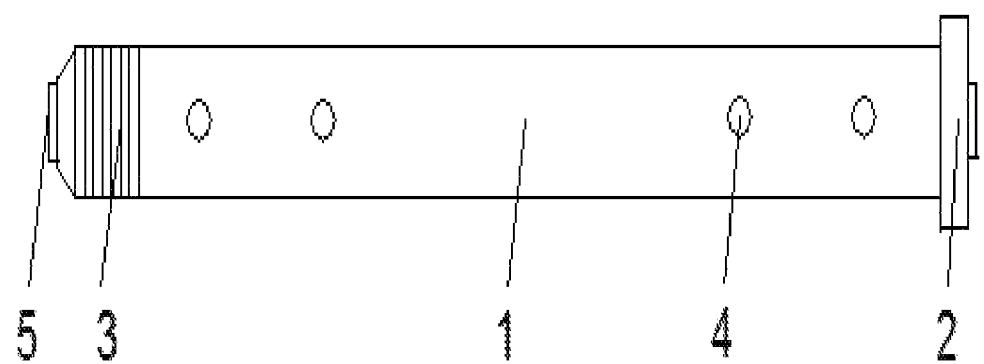
FIG. 2 is a side view of a portion of the Suspension Bearing Lubricating System without bushings shown in FIG. 1.
Figure 3:
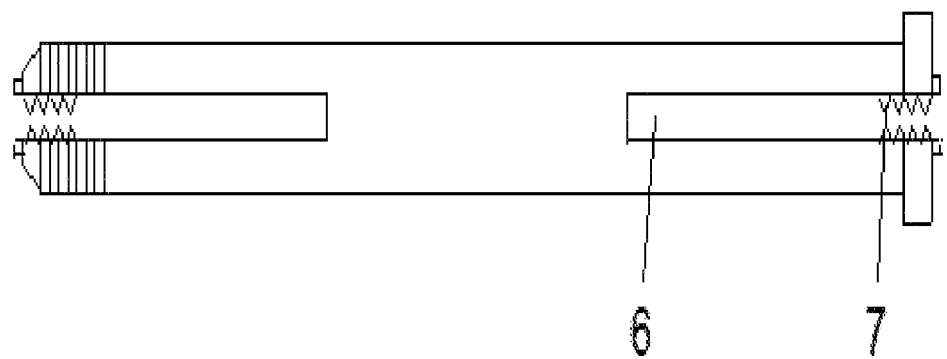
FIG. 3 is a cut-away, side view of Suspension Bearing Lubricating System without bushings shown in FIG. 1.
Figure 4:
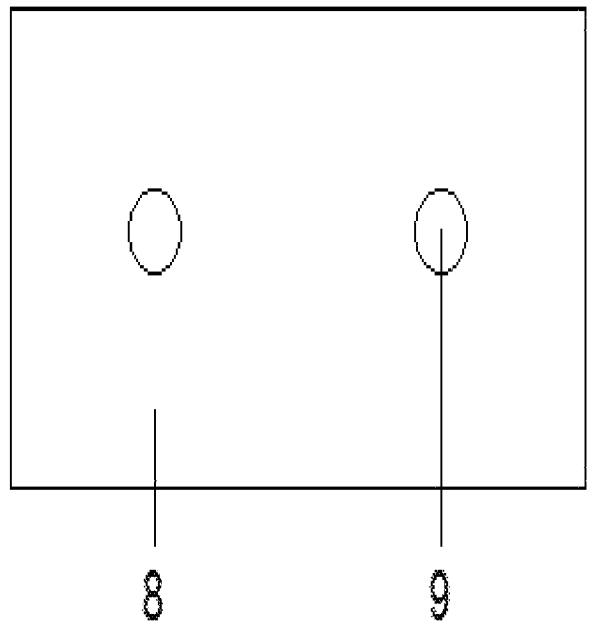
FIG. 4 is an enlarged cross sectional view of the specialized bushing a shown in FIG. 1.
Figure 5:
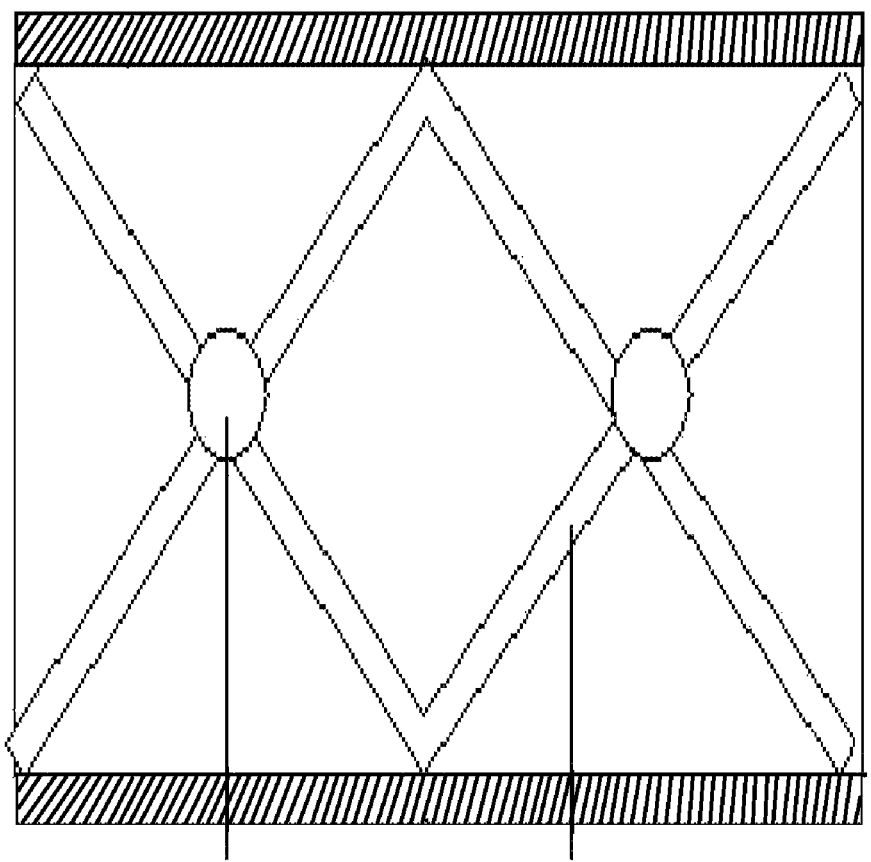
FIG. 5 is an enlarged, cut-away, cross sectional view of the specialized bushing a shown in FIG. 4.

Shown in FIG. 1 is the complete Suspension Bearing Lubricating System. FIG. 2 shows lubricant receptacles 5 secured to the threads 7 of FIG. 3. Lubricant will enter the lubricant receptacles 5 until it fills the passageway(s) 6 shown in FIG. 3 in the shaft 1 of the bolt. Once the lubricant fills and forces itself out of the passageway(s) 6, it flows from the holes 4 shown in FIG. 2. The lubricant will flow from the holes 4 into the specialized bushing's grooves 10 shown in FIG. 5. The lubricant will travel along the lubricant guide grooves 10 to the exit holes 9 of the specialized bushing(s) shown in FIG. 5. Once the lubricant reaches the exit holes 9, it will flow directly into the suspension component's bearings. Thus, lubricating them and preventing them from premature wear and failure.

Figure 5A:
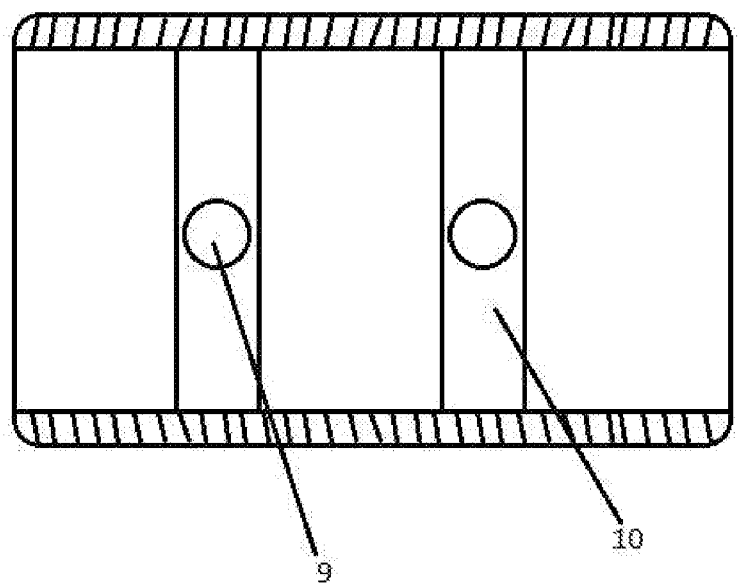
FIG. 5A is an enlarged, cut-away, cross sectional view of a second embodiment of a specialized bushing.

Another embodiment of a specialized bushing 8 is shown in FIG. 5A, which provides a cross sectional view of the bushing 8 along the longitudinal axis thereof. As shown, the interior surface of the bushing may be formed with two pairs of exit holes 9, wherein a first pair may be separated from a second pair along the length of the bushing 8, and wherein each exit hole 8 in a pair thereof may be opposed to one another at 180 degrees, although other orientations may be used without limitation unless otherwise indicated in the following claims. The guide grooves 10 may be annular in shape and may intersect a pair of exit holes 9. As shown, the bushing 8 is formed with four exit holes 8 and two guide grooves 10, wherein each guide groove 10 corresponds to one pair of exit holes 8. However, other numbers of exit holes 8 and/or guide grooves 10, and/or other configurations thereof with relation to one another and/or other elements/features of the bushing 8 without limitation unless otherwise indicated in the following claims.

The round bar stock is cut to desired length then placed in a CNC machine and turned down until given the appropriate circumference of the bolt head 2 then again to reach the circumference of the bolt shaft 1. The threads of the bolt 3 will then be machined into the end of the shaft 1. The bolt will then have passageway(s) 6 drilled into the center of the ends of the bolt. Next the holes 4 appearing in FIG. 2 are drilled into the shaft 1. Once the holes 4 are in place, the lubricant receptacle threads 7 will be tapped in each lubricant passageway 6. The specialized bushing 8 will be made from pipe pre-cut to desired diameter then cut to desired length. The lubricant guide grooves 10 are machined into the inside of the specialized bushing 8 with a CNC machine. Lastly the specialized bushing's lubricant exit holes 9 will be drilled out completely. This completes the manufacturing process of the Suspension Bearing Lubricating System.

In the above-presented embodiment examples, the lubrication system was installed in a dirt bike equipped with a pivoting swing arm and linkage suspension assembly, where it secures the swing arm, shock, and a linkage assembly. The lubrication system is also suitable for other machines equipped with a pivoting swing arm and linkage assembly, or also such other working machines that have a suspension assembly requiring continuous or intermittent lubrication during the operation of said working machine. Consequently, the present disclosure is not limited to the embodiment examples presented above, but it may vary within the scope of the appended claims. Those of ordinarily skill in the art will at once recognize various changes and modifications from those which have been disclosed, but all such changes and modifications will not depart from the essence of the invention as disclosed herein, and all such changes and modifications are intended to be covered by the appended claims.

The materials used to construct the apparatuses and/or components thereof for a specific process will vary depending on the specific application thereof, but it is contemplated that polymers, synthetic materials, metals, metal alloys, natural materials, and/or combinations thereof may be especially useful in some applications. Accordingly, the above-referenced elements may be constructed of any material known to those skilled in the art or later developed, which material is appropriate for the specific application of the present disclosure without departing from the spirit and scope of the present disclosure unless so indicated in the following claims.

Having described preferred aspects of the various processes, apparatuses, and products made thereby, other features of the present disclosure will undoubtedly occur to those versed in the art, as will numerous modifications and alterations in the embodiments and/or aspects as illustrated herein, all of which may be achieved without departing from the spirit and scope of the present disclosure. Accordingly, the methods and embodiments pictured and described herein are for illustrative purposes only, and the scope of the present disclosure extends to all processes, apparatuses, and/or structures for providing the various benefits and/or features of the present disclosure unless so indicated in the following claims.

While the apparatuses, methods, and elements thereof in the present disclosure have been described in connection with preferred aspects and specific examples, it is not intended that the scope be limited to the particular embodiments and/or aspects set forth, as the embodiments and/or aspects herein are intended in all respects to be illustrative rather than restrictive. Accordingly, the processes and embodiments pictured and described herein are no way limiting to the scope of the present disclosure unless so stated in the following claims.

Although several figures are drawn to accurate scale, any dimensions provided herein are for illustrative purposes only and in no way limit the scope of the present disclosure unless so indicated in the following claims. It should be noted that the apparatuses, methods, and elements thereof as disclosed herein are not limited to the specific embodiments pictured and described herein, but rather the scope of the inventive features according to the present disclosure is defined by the claims herein. Modifications and alterations from the described embodiments will occur to those skilled in the art without departure from the spirit and scope of the present disclosure.

Any of the various features, components, functionalities, advantages, aspects, configurations, process steps, process parameters, etc. of an apparatus and/or method disclosed herein, may be used alone or in combination with one another depending on the compatibility of the features, components, functionalities, advantages, aspects, configurations, process steps, process parameters, etc. Accordingly, an infinite number of variations of the present disclosure exist. Modifications and/or substitutions of one feature, component, functionality, aspect, configuration, process step, process parameter, etc. for another in no way limit the scope of the present disclosure unless so indicated in the following claims.

It is understood that the present disclosure extends to all alternative combinations of one or more of the individual features mentioned, evident from the text and/or drawings, and/or inherently disclosed. All of these different combinations constitute various alternative aspects of the present disclosure and/or components thereof. The embodiments described herein explain the best modes known for practicing the apparatuses, methods, and/or components disclosed herein and will enable others skilled in the art to utilize the same. The claims are to be construed to include alternative embodiments to the extent permitted by the prior art.

Unless otherwise expressly stated in the claims, it is in no way intended that any process or method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: matters of logic with respect to arrangement of steps or operational flow; plain meaning derived from grammatical organization or punctuation; the number or type of embodiments described in the specification.

What is claimed is:

1. A suspension bearing lubrication system comprising:
 a. a bolt having a first end formed as a bolt head having a first axial face and a second end formed as threads having second axial face, said bolt comprising:
  i. a shaft positioned between said first and second ends;
  ii. a first longitudinal passageway extending longitudinally into said first axial face along a first portion of a length of said bolt;
  iii. a second longitudinal passageway extending longitudinally into said second axial face along a second portion of said length of said bolt, wherein said first and second longitudinal passageways are not fluidly connected with one another and are separated by a portion of said shaft;
  iv. a first set of receptacle threads formed at a distal end of said first longitudinal passageway;
  v. a second set of receptacle threads formed at a distal end of said second longitudinal passageway;
  vi. a first hole extending from an exterior of said bolt to said first longitudinal passageway, wherein said first hole is oriented in a radial dimension with respect to said bolt;
  vii. a second hole extending from an exterior of said bolt to said second longitudinal passageway, wherein said second hole is oriented in said radial dimension with respect to said bolt, and wherein said shaft axially spaces said first hole from said second hole;
 b. a first lubricant receptacle engaged with said first set of receptacle threads and in fluid communication with said first longitudinal passageway;
 c. a second lubricant receptacle engaged with said second set of receptacle threads and in fluid communication with said second longitudinal passageway;
 d. a first bushing positioned over a portion of said exterior of said bolt adjacent said first end of said bolt, said first bushing comprising:
  i. an exterior surface;
  ii. an interior surface formed with a plurality of lubricant guide grooves, an exit hole positioned adjacent one of said lubricant guide grooves, wherein said exit hole extends from said exterior surface to said interior surface, and wherein at least two of said plurality of lubricant guide grooves intersect at said exit hole;

e. a second bushing positioned over a portion of said exterior of said bolt adjacent said second end of said bolt, said first bushing comprising:
  i. an exterior surface;
  ii. an interior surface formed with a lubricant guide groove, an exit hole positioned adjacent said lubricant guide groove, wherein said exit hole extends from said exterior surface to said interior surface.

2. The suspension bearing lubrication system according to claim 1 wherein said exit hole of said first bushing is further defined as being aligned with said first hole in said bolt.

3. The suspension bearing lubrication system according to claim 1 wherein said exit hole of said second bushing is further defined as being aligned with said second hole in said bolt.

4. The suspension bearing lubrication system according to claim 1 wherein said bolt further comprises a third hole extending from an exterior of said bolt to said first longitudinal passageway, wherein said third hole is oriented in a radial dimension with respect to said bolt, and wherein said third hole is axially spaced from said first hole.

5. The suspension bearing lubrication system according to claim 4 wherein said bolt further comprises a fourth hole extending from an exterior of said bolt to said second longitudinal passageway, wherein said fourth hole is oriented in a radial dimension with respect to said bolt, and wherein said third hole is axially spaced from said second hole.

6. The suspension bearing lubrication system according to claim 5 wherein said first bushing further comprises a second exit hole at an intersection of said plurality of lubricant grooves.

7. The suspension bearing lubrication system according to claim 6 wherein said second bushing further comprises a second exit hole at a second intersection of said plurality of lubricant grooves.

8. The suspension bearing lubrication system according to claim 7 wherein said bolt further comprises a fifth hole extending from an exterior of said bolt to said first longitudinal passageway, wherein said fifth hole is oriented in a radial dimension with respect to said bolt, and wherein said fifth hole is radially spaced from said first hole by 180 degrees.

9. The suspension bearing lubrication system according to claim 8 wherein said bolt further comprises a sixth hole extending from an exterior of said bolt to said second longitudinal passageway, wherein said sixth hole is oriented in a radial dimension with respect to said bolt, and wherein said sixth hole is radially spaced from said second hole by 180 degrees.

10. The suspension bearing lubrication system according to claim 1 wherein said plurality of lubricant guide grooves of said first bushing are further defined as being annular in shape.

11. The suspension bearing lubrication system according to claim 1 wherein said plurality of lubricant guide grooves of said first bushing are further defined as being semi-annular in shape and are oriented perpendicular with respect to a longitudinal axis of said bolt.

12. The suspension bearing lubrication system according to claim 1 wherein said lubricant guide groove of said second bushing is further defined as being annular in shape and oriented perpendicular with respect to a longitudinal axis of said bolt.

13. The suspension bearing lubrication system according to claim 1 wherein said lubricant guide groove of said second bushing is further defined as being semi-annular in shape and oriented perpendicular with respect to a longitudinal axis of said bolt.

14. A suspension bearing lubrication system comprising:
a. a bolt having a first end formed as a bolt head having a first axial face and a second end formed as threads having second axial face, said bolt comprising:
  i. a shaft positioned between said first and second ends;
  ii. a first longitudinal passageway extending longitudinally into said first axial face along a first portion of a length of said bolt;
  iii. a second longitudinal passageway extending longitudinally into said second axial face along a second portion of said length of said bolt, wherein said first and second longitudinal passageways are not fluidly connected with one another and are separated by a portion of said shaft;
  iv. a first set of receptacle threads formed at a distal end of said first longitudinal passageway;
  v. a second set of receptacle threads formed at a distal end of said second longitudinal passageway;
  vi. a first hole extending from an exterior of said bolt to said first longitudinal passageway, wherein said first hole is oriented in a radial dimension with respect to said bolt;
  vii. a second hole extending from an exterior of said bolt to said second longitudinal passageway, wherein said second hole is oriented in said radial dimension with respect to said bolt, and wherein said shaft axially spaces said first hole from said second hole;
b. a first lubricant receptacle engaged with said first set of receptacle threads and in fluid communication with said first longitudinal passageway;
c. a second lubricant receptacle engaged with said second set of receptacle threads and in fluid communication with said second longitudinal passageway;
d. a first bushing positioned over a portion of said exterior of said bolt adjacent said first end of said bolt, said first bushing comprising:
  i. an exterior surface;
  ii. an interior surface formed with a lubricant guide groove, an exit hole positioned adjacent said lubricant guide groove, wherein said exit hole extends from said exterior surface to said interior surface;
e. a second bushing positioned over a portion of said exterior of said bolt adjacent said second end of said bolt, said second bushing comprising:
  i. an exterior surface;
  ii. an interior surface formed with a plurality of lubricant guide grooves, an exit hole positioned adjacent said lubricant guide groove, wherein said exit hole extends from said exterior surface to said interior surface, and wherein at least two of said plurality of lubricant guide grooves intersect at said exit hole.

15. The suspension bearing lubrication system according to claim 14 wherein said lubricant guide groove of said first bushing is further defined as being annular in shape.

16. The suspension bearing lubrication system according to claim 15 wherein said first bushing further comprises a second lubricant guide groove, and wherein said second lubricant guide groove is annular in shape.

17. The suspension bearing lubrication system according to claim 14 wherein said lubricant guide groove of said first bushing are further defined as being annular in shape and oriented perpendicular with respect to a longitudinal axis of said bolt.

18. The suspension bearing lubrication system according to claim 14 wherein said lubricant guide groove of said first bushing are further defined as being semi-annular in shape and oriented perpendicular with respect to a longitudinal axis of said bolt.

19. The suspension bearing lubrication system according to claim 14 wherein said plurality of lubricant guide grooves of said second bushing are further defined as being annular in shape.

20. The suspension bearing lubrication system according to claim 14 wherein said plurality of lubricant guide grooves of said second bushing are further defined as being semi-annular in shape and are oriented perpendicular with respect to a longitudinal axis of said bolt.

* * * * *